May 21, 1929. G. B. TOURTELLOTTE 1,714,197
METHOD OF AND APPARATUS FOR TESTING FIRE EXTINGUISHERS
Filed Oct. 12, 1926
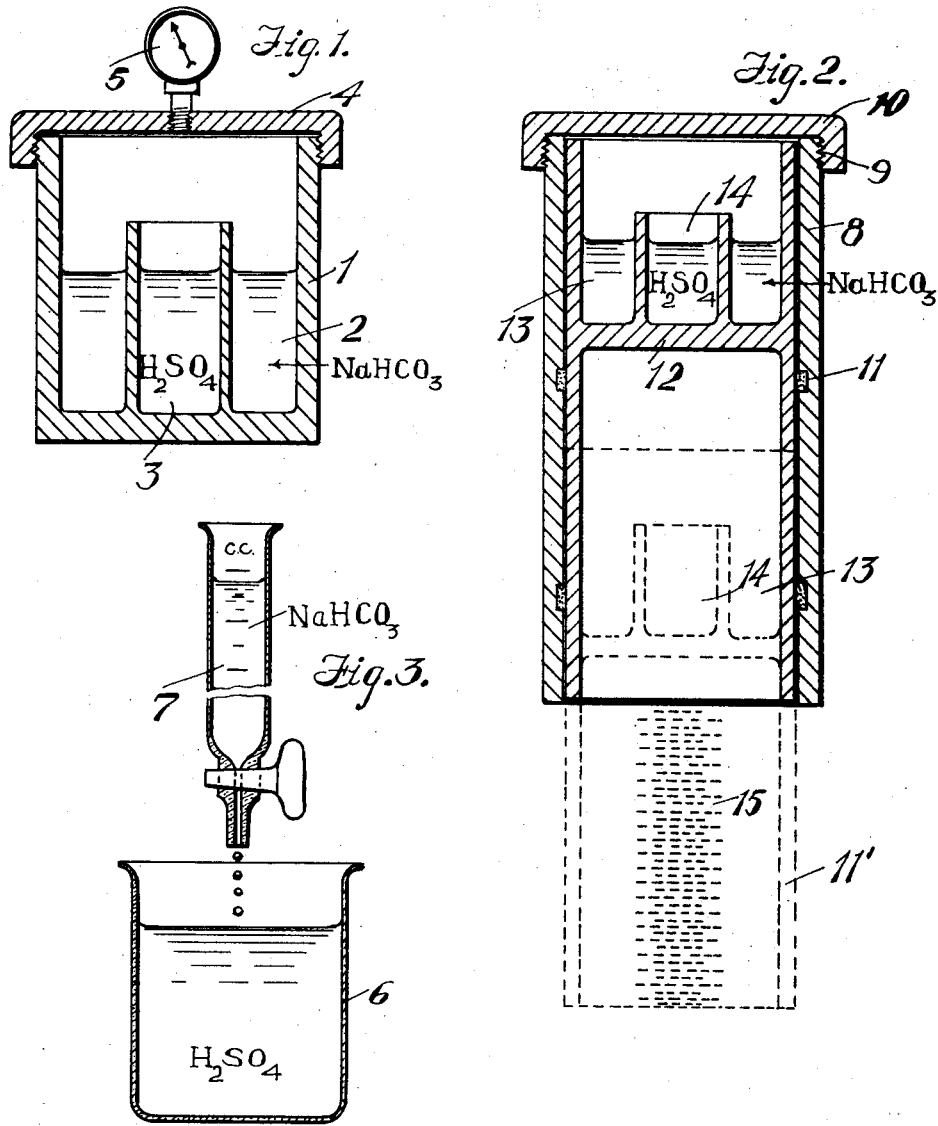
INVENTOR.
George B. Tourtellotte,
BY
Harry W. Bowen.
ATTORNEY.

Patented May 21, 1929.

1,714,197

UNITED STATES PATENT OFFICE.

GEORGE B. TOURTELLOTTE, OF SPRINGFIELD, MASSACHUSETTS.

METHOD OF AND APPARATUS FOR TESTING FIRE EXTINGUISHERS.

Application filed October 12, 1926. Serial No. 141,121.

This invention relates to improvements in the method of and apparatus for testing fire extinguishers, particularly of the type known as hand extinguishers, although it is not to be understood that it is intended to be limited to hand extinguishers.

An object of the invention is to determine whether or not the acid and alkali solution in these extinguishers is of the proper or correct strength, or up to standard requirements in order to produce the requisite pressure when the extinguisher is brought into use.

Frequently, the liquid solutions within the extinguishers are found to have deteriorated or greatly weakened especially where extinguishers are located in or near illuminating gas plants. Oftentimes it is found that the extinguishers after recharging are not in workable condition due to the acid and alkali solutions not being of proper strength.

An object of the invention is therefore to take a sample of the alkali and acid solution from the extinguisher to be tested, and place them in a testing apparatus, which, to all intents and purposes is a miniature extinguisher which is provided with a suitable indicating pressure gauge. Then, upon the mixing of the acid and alkali, if they are of proper workable strength, the pressure gauge will indicate whether or not the solutions of the extinguisher being tested are of the proper strength and not weakened ones, or one of them.

Oftentimes it has been discovered that there is a creeping of one solution into the other and a slow mixing or generation of the gases will result rendering the extinguisher useless. At the present time the extinguishers are usually tested by wholly discharging the solution. This is wasteful particularly if the solutions are not weakened ones.

The present invention is further capable of testing the strength of the solutions by the volume of the gas generated which consists in general of a container for receiving a sample of the acid and alkali solutions whereby when these two solutions are brought together a definite volume of gas will be generated, if both of the samples are of proper strength.

A further object is in testing the solutions that are to be placed within the extinguisher when they are being charged that is to say, the alkali and the acid by means of the titration method which consists in taking a definite volume of the acid and then titrating with a standard solution of alkali and noting how many cubic centimeters are required to neutralize the solution under test. It is to be understood that either the acid or the alkali solution may be tested this way.

Referring to the drawings:

Fig. 1 represents a miniature extinguisher in section showing the gauge and indicating the liquids therein to be tested.

Fig. 2 is a device for testing the volume of gas generated; and

Fig. 3 is a method of indicating the quality or strength of the solution to be tested.

Referring to the drawings in detail:

1 designates a container having a compartment 2 for receiving a sample of the sodium bicarbonate $NaHCO_3$ which is to be tested. It is to be understood that a sample of this alkali solution has been taken from the extinguisher to be tested by means of a pipette or other suitable implement. 3 designates an inner compartment for receiving a test sample of the acid, $H_2SO_4$ of the extinguisher under test. After these solutions are placed in the container 1, the cap 4 is threaded into place and the container inverted for mixing the two compounds, thus a pressure of gas by the mixture of these chemical compounds is produced. The pressure generated will be indicated by the gauge 5. It is to be understood that if the solutions under test are of proper strength, and, that a definite quantity is tested each time then the gauge will show the same reading. In order to determine whether or not the liquid compounds are of the proper strength, they may be tested separately by means of the construction shown in Fig. 3 which comprises a container 6 in which the sulphuric acid or alkali solution is placed. As shown, the sulphuric acid is placed in the container 6. 7 designates the usual apparatus for receiving a definite quantity of the standard solution of alkali. It is well known that a definite number of cubic centimeters of the alkali will neutralize a definite number of cubic centimeters of the acid and vice versa. By this method the acid and alkali may be carefully tested before being placed in the container shown in Fig. 1, or in the extinguisher.

Fig. 2 illustrates a device for volumetrically testing the volume of gas that is generated when the acid and alkali solutions of an extinguisher are mixed together. 8 designates the outer casing formed with a threaded upper end portion 9 and a closure cap 10. Slidably located within the casing 8 is a member 11 formed with a partition 12. The compartment 13 is for receiving the tested sample of the alkali solution and the compartment 14 for receiving the tested sample of the acid solution. These samples are placed in this compartment and the cap 10 is threaded on the casing 8. The solutions are mixed together by inverting the apparatus when a definite volume of gas will be generated; causing the inner casing to move outward into the dotted line position shown at 11'. The inner casing 11 is provided with graduation or volume marks 15 for indicating the volume of gas in cubic centimeters that is generated. It will be seen that Figs. 1 and 2 are for the purpose of mechanically testing the solutions of the extinguishers and Fig. 3 is for chemically testing these solutions.

What I claim is:

1. A device for the purpose described comprising a container having a plurality of disconnected compartments for receiving a definite quantity of a sample of the acid and alkali compounds of a fire extinguisher to be tested, a closure cap, a gauge attached thereto whereby when the solutions are mixed together the gauge will indicate the condition of the compounds under test.

2. A device for the purpose described comprising an outer and inner casing, the inner casing being slidably mounted therein and having compartments for receiving the test sample of the compounds of the fire extinguishers, a closure cap for the outer casing whereby when the compounds are mixed together, the inner casing will be moved outward, and graduations on the inner casing for indicating the volume of the gas generated.

3. The method of testing the strength of the acid and alkali solutions of a fire extinguisher which consists in placing a measured quantity or sample of each solution in a container, having normally separated compartments which are open at their upper ends which is provided with a closure member and a pressure gauge, then mixing the solutions by partially inverting for generating a gas and noting the pressure developed by the gas.

4. The method of testing and determining the strength of the alkali and acid solutions of a fire extinguisher which consists in first taking a definite volume of each solution from the extinguisher, then placing them in a container having separate compartments, which container is slidably mounted within an outer casing, then closing the container and inverting the same, and noting the volume of gas generated by means of notations on the slidable member, as described.

GEORGE B. TOURTELLOTTE.